United States Patent
Sugie et al.

(10) Patent No.: US 7,514,177 B2
(45) Date of Patent: Apr. 7, 2009

(54) LEAD STORAGE BATTERY

(75) Inventors: Kazuhiro Sugie, Shizuoka (JP); Kazuhiko Shimoda, Shizuoka (JP); Shinichi Iwasaki, Shizuoka (JP)

(73) Assignee: Panasonic Corporation, Osaka (JP)

( * ) Notice: Subject to any disclaimer, the term of this patent is extended or adjusted under 35 U.S.C. 154(b) by 290 days.

(21) Appl. No.: 10/589,464

(22) PCT Filed: Jun. 14, 2005

(86) PCT No.: PCT/JP2005/010887

§ 371 (c)(1),
(2), (4) Date: Aug. 14, 2006

(87) PCT Pub. No.: WO2005/124920

PCT Pub. Date: Dec. 29, 2005

(65) Prior Publication Data

US 2007/0172727 A1    Jul. 26, 2007

(30) Foreign Application Priority Data

Jun. 16, 2004 (JP) ............................ 2004-177871

(51) Int. Cl.
*H01M 4/60* (2006.01)
*H01M 2/28* (2006.01)
*H01M 4/58* (2006.01)
*H01M 2/16* (2006.01)

(52) U.S. Cl. .................... 429/213; 429/161; 429/218.1; 429/249

(58) Field of Classification Search ................ 429/160, 429/161, 247, 249, 213, 218.1
See application file for complete search history.

(56) References Cited

U.S. PATENT DOCUMENTS 5,948,567 A     9/1999   Heller (Continued)

FOREIGN PATENT DOCUMENTS

JP         62-064045       *    3/1987

(Continued)

OTHER PUBLICATIONS

Taiwanese Office Action, issued in corresponding Taiwanese Patent Application No. 094117826, dated on Aug. 17, 2007.

(Continued)

*Primary Examiner*—Patrick Ryan
*Assistant Examiner*—Thomas H. Parsons
(74) *Attorney, Agent, or Firm*—McDermott Will & Emery LLP

(57) ABSTRACT

A lead storage battery of the present invention has: an electrode plate pack including a plurality of negative electrode plates which each comprise a negative electrode grid having a tab and a negative electrode active material layer retained by the negative electrode grid, a plurality of positive electrode plates which each comprise a positive electrode grid having a tab and a positive electrode active material layer retained by the positive electrode grid, and a plurality of separators separating the positive and negative electrode plates; a positive electrode connecting member connected to each positive electrode plate of the electrode plate pack; and a negative electrode connecting member connected to each negative electrode plate of the electrode plate pack. The negative electrode active material layer includes 0.0001 to 0.003 wt % of Sb, and includes 0.01 to 2 wt % of a condensate of bisphenol and aminobenzene sulfonic acid derivative.

4 Claims, 6 Drawing Sheets

U.S. PATENT DOCUMENTS

| | | | |
|---|---|---|---|
| 6,074,782 A | 6/2000 | Mizutani et al. | |
| 6,455,191 B2 * | 9/2002 | Omae et al. | 429/160 |

FOREIGN PATENT DOCUMENTS

| | | | |
|---|---|---|---|
| JP | 3-37962 A | 2/1991 | |
| JP | 7-94205 A | 4/1995 | |
| JP | 8-329975 A | 12/1996 | |
| JP | 11-121008 A | 4/1999 | |
| JP | 11-250913 A | 9/1999 | |
| JP | 2002-134114 | 5/2002 | |
| JP | 2003-338284 A | 11/2003 | |
| JP | 2003-338312 A | 11/2003 | |
| JP | 2003-346888 | * 12/2003 | |
| JP | 2003-346888 A | 12/2003 | |

OTHER PUBLICATIONS

European Search Report issued in European Patent Application No. EP 05 75 0833, mailed Sep. 2, 2008.

* cited by examiner

LEAD STORAGE BATTERY

RELATED APPLICATIONS

This application is the U.S. National Phase under 35 U.S.C. § 371 of International Application No. PCT/JP2005/010887, filed on Jun. 14, 2005, which in turn claims the benefit of Japanese Application No. 2004-177871, filed on Jun. 16, 2004, the disclosures of which Applications are incorporated by reference herein.

TECHNICAL FIELD

The present invention relates to a lead storage battery. More particularly, the present invention relates to an improvement of service life characteristics of a lead storage battery used for vehicles carrying a stop-and-go-system and a regenerative-braking-system.

BACKGROUND ART

Conventionally, a lead storage battery has been used for starting an engine of a vehicle and for a back-up power source. Among these usages, a lead storage battery for starting an engine functions to supply electricity to various electric and electronic devices mounted on vehicles, in addition to a cell motor for starting an engine. After starting an engine, a lead storage battery is charged by an alternator. An output voltage and an output current of the alternator are set so that SOC (state of charge) of the lead storage battery is maintained to be 90 to 100%.

In recent years, a demand for an improvement of a fuel-efficiency of a vehicle is increasing, in view of environmental conservation. For such a demand, a vehicle carrying a stop-and-go-system and a regenerative-braking-system has been considered, for example. In the stop-and-go-system, an engine is stopped while the vehicle is idling, and in the regenerative-braking-system, a kinetic energy of a vehicle at the time of deceleration is converted to an electric energy, and the electric energy is stored.

In a vehicle carrying the stop-and-go-system, the lead storage battery is not charged when the vehicle is stopped in an idle stop mode. The lead storage battery sometimes supplies electric power to devices mounted on the vehicle while in such a state. Thus, in comparison with a conventional lead storage battery for starting engines, SOC of the lead storage battery inevitably becomes low. In a vehicle carrying the regenerative-braking-system, SOC of the lead storage battery has to be controlled to be lower, to about 50 to 90%, since electric energy is stored by the lead storage battery at the time of regeneration (deceleration).

In any of these systems, charge and discharge (hereinafter referred to as charge/discharge) are repeated frequently with a lower SOC range than ever. Further, based on an increase in a dark current accompanied with vehicle parts increasingly becoming electrically powered, a discharge of the lead storage battery advances while a vehicle is stopped for a long period of time, thereby leaving a possibility for an over discharge.

Therefore, for a lead storage battery to be used in vehicles carrying these systems, service life characteristics under a usage mode in which charge/discharge is repeated frequently with a lower SOC range need to be improved.

For deterioration factors of a lead storage battery under such usage mode, an insufficient charge due to decline in chargeability of the lead storage battery can be mentioned, mainly. Since a charge system of a vehicle is based on constant voltage control, when chargeability of a negative electrode plate is reduced, a potential of negative electrode decreases at an initial stage of charge and a voltage rapidly rises up to a preset voltage value, and a current decreases sooner. Thus, a sufficient amount of charged electricity of a lead storage battery can not be secured, thereby rendering the battery to be in an undercharged state.

For suppressing such deterioration, there has been proposed a method in which a lead alloy layer containing Sn and Sb is formed on a surface of a positive electrode grid of a Pb—Ca—Sn alloy, for example (Patent Document 1). The formation of such layer will suppress a deterioration of the positive electrode active material and a formation of a passivated layer at an interface between the positive electrode active material and the positive electrode grid.

Also, a part of Sb which exists on a surface of the positive electrode grid dissolves in an electrolyte, and deposits on a negative electrode plate. The deposited Sb on a negative electrode active material raises a charging potential of the negative electrode plate, and a charging voltage lowers down, thereby improving chargeability of a lead storage battery. As a result, deterioration of the lead storage battery due to insufficient charge during charge/discharge cycle is suppressed.

This method is very effective in an engine starting lead storage battery which is used while SOC is over 90%, and service life characteristics will drastically improve.

However, when a lead storage battery is to be used in a vehicle equipped with the above stop-and-go-system or the regenerative-braking-system, that is, when a lead storage battery is to be used in a mode in which charge/discharge is repeated under lower SOC range, there was a problem in that the water content in the electrolyte rapidly decreases at the end of its service life, while the chargeability could be secured.

When the water content in the electrolyte decreases, a negative electrode strap and a tab of negative electrode grid are exposed from the electrolyte. By being exposed to the oxygen in the air, a welded part of the strap and the tab is corroded, leading to a possibility of a disconnection.

Also, even the negative electrode strap and the tab of negative electrode grid are being immersed in the electrolyte, the tab of negative electrode grid is easily being corroded when Sb is deposited in a very small amount on a surface of the tab of negative electrode grid by dissolution of Sb included in the positive electrode grid, and in a positive electrode connecting member comprising a positive electrode strap and a positive electrode pole or a positive electrode connecting body into the electrolyte.

Additionally, there has been proposed in Patent Document 2 to dispose a separator comprising a glass fiber mat having resistance to acids between the positive electrode plate and the negative electrode plate, in order to suppress a separation of the positive electrode active material. When the glass fiber mat is used, an internal pressure of a battery increases compared with the case when a micro-porous polyethylene sheet, which is commonly used in a starter lead storage battery, is used. Such increase in the internal pressure caused a problem: chargeability of the negative electrode plate declined, and a service life of the battery is shortened.

Also, although a lignin compound as an expander and carbon as a conductive material to be added to the negative electrode active material layer have effects to improve chargeability of the negative electrode plate, since these additives decompose or dissolve from the active material layer, it is difficult to maintain the effects. Also, when the amounts of these additives are increased to maintain the effects, there is a possibility to cause a problem in battery performances such as declines in chargeability and discharge characteristics at an initial period. There is also a possibility to cause a problem in manufacturing process: the negative electrode paste can not be charged to the negative electrode grid in good condition, and unevenness in the amount of the negative electrode paste to be retained increases.

Patent Document 1: Japanese Laid-Open Patent Publication No. Hei 3-37962
Patent Document 2: Japanese Laid-Open Patent Publication No. Hei 7-94205

DISCLOSURE OF INVENTION

Problem That the Invention is to Solve

Thus, an object of the present invention is to provide a lead storage battery with a longer service life and high reliability under a usage mode where a charge/discharge is repeated frequently while SOC is in a low range, by improving deterioration of the positive electrode plate due to deep discharge and chargeability of the negative electrode plate, suppressing a decrease in an amount of electrolyte due to repeated charge/discharge, and suppressing a corrosion of the tab of negative electrode grid.

Means for Solving the Problem

The present invention is a lead storage battery including:
an electrode plate pack comprising a plurality of negative electrode plates which each comprise a negative electrode grid having a tab and a negative electrode active material layer retained by the negative electrode grid, a plurality of positive electrode plates which each comprise a positive electrode grid having a tab and a positive electrode active material layer retained by the positive electrode grid, and a plurality of separators separating the positive electrode plate and the negative electrode plate;
a positive electrode connecting member comprising a positive electrode strap to which the tab of each positive electrode plate of the electrode plate pack is connected, and a positive electrode pole or a positive electrode connecting body provided at the positive electrode strap; and
a negative electrode connecting member comprising a negative electrode strap to which the tab of each negative electrode plate of the electrode plate pack is connected, and a negative electrode pole or a negative electrode connecting body provided at the negative electrode strap,
wherein the positive electrode grid, the negative electrode grid, the positive electrode connecting member, and the negative electrode connecting member comprise a Pb-alloy including at least one of Ca and Sn,
the negative electrode active material layer includes 0.0001 to 0.003 wt % of Sb, and
the negative electrode active material layer includes 0.01 to 2 wt % of a condensate of bisphenol and aminobenzene sulfonic acid derivative.

It is preferable that the Sb content in the negative electrode active material layer is 0.0001 to 0.001 wt %.
It is preferable that the separator comprises a fiber having resistance to acids.
It is preferable that the fiber is a glass fiber or a synthetic fiber.

Effects of the Invention

According to the present invention, a lead storage battery with a longer service life and high reliability can be obtained under a usage mode in which charge/discharge is frequently repeated under a comparatively low range of SOC, since chargeability is improved, and corrosion of a tab of negative electrode grid is suppressed by suppressing a decrease in an amount of electrolyte. An excellent maintenance-free lead storage battery can be obtained, since a decrease in an amount of electrolyte is suppressed due to repeated charge/discharge. Also, although there is a possibility for the battery to be in an over-discharge state under such usage mode, the corrosion of the tab of negative electrode grid can be suppressed even under the over-discharge state, according to the present invention.

BEST MODE FOR CARRYING OUT THE INVENTION

The present invention relates to a lead storage battery for vehicles carrying a stop-and-go-system and a regenerative-braking-system. In the present invention, a Pb-alloy substantially not including Sb which advances corrosion of a tab of negative electrode grid is used for a positive electrode grid, a positive electrode connecting member, a negative electrode grid, and a negative electrode connecting member. Sb in an amount of 0.0001 to 0.003 wt % and 0.01 to 2 wt % of a condensate of bisphenol and aminobenzene sulfonic acid derivative are included in the negative electrode active material layer. Based on such battery, a service life of the battery can be extended significantly for a usage mode of the above systems which repeat charge/discharge frequently under a low SOC range.

Figure 1:
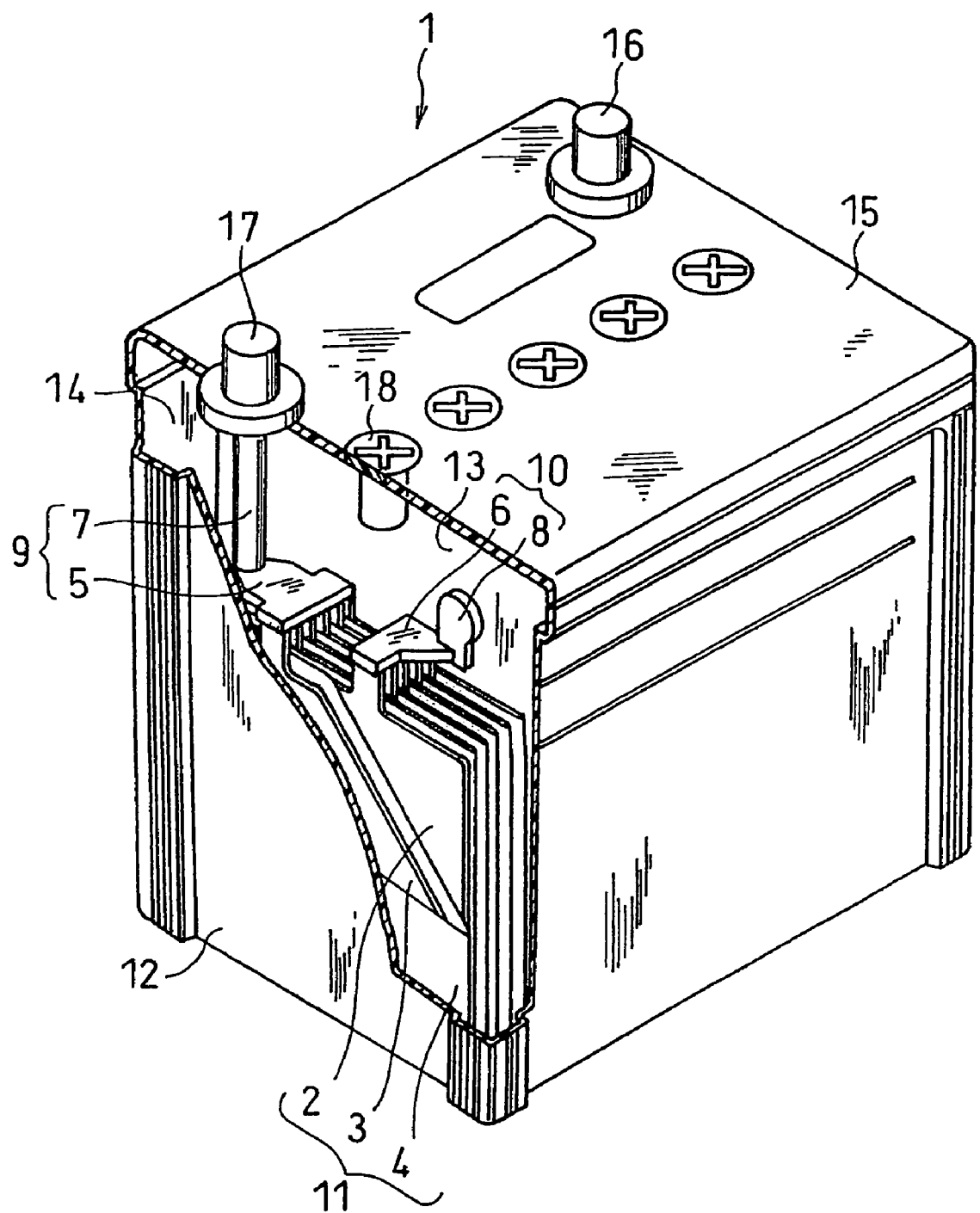
[FIG. 1] A partially cut away perspective view of a lead storage battery of an example of the present invention.

In the following, embodiments of the present invention are explained in detail. FIG. 1 is a partially cut away perspective view of a lead storage battery of the present invention.

A battery container 12 of a lead storage battery 1 is divided by partitions 13 to have a plurality of cell chambers 14, and an electrode plate pack 11 is stored in each cell chamber 14. The electrode plate pack 11 is structured by stacking up a plurality of positive electrode plates 2 and negative electrode plates 3 interposing a separator 4 between positive and negative electrode plates. The positive electrode plate 2 is connected to a positive electrode connecting member 10, and the negative electrode plate 3 is connected to a negative electrode connecting member 9.

In the electrode plate pack 11, a tab 22 of positive electrode grid of the positive electrode plate 2 is connected to a positive electrode strap 6, and a tab 32 of negative electrode grid of the negative electrode plate 3 is connected to a negative electrode strap 5. A positive electrode connecting body 8 connected to the positive electrode strap 6 of the electrode plate pack 11 in one cell chamber 14 is connected with a negative electrode connecting body connected to a negative electrode strap of an electrode plate pack 11 inside of adjacent cell chamber 14 via a through hole provided in the partition 13. Thus, one electrode plate pack 11 is connected with another electrode plate pack 11 in adjacent cell chamber 14 in series. A positive electrode pole is formed on a positive electrode strap at one end of the battery container 12, and a negative electrode pole 7 is formed on the negative electrode strap 5 on another end of the battery container 12.

Thus, the positive electrode connecting member 10 comprises the positive electrode strap 6 to which the tab 22 of positive electrode grid is connected, and the positive electrode pole or the positive electrode connecting body 8 provided on the positive electrode strap 6; and the negative electrode connecting member 9 comprises the negative electrode strap 5 to which the tab 32 of negative electrode grid is connected, and the negative electrode pole 7 or the negative electrode connecting body provided on the negative electrode strap 5.

A lid 15 provided with a positive electrode terminal 16 and a negative electrode terminal 17 is attached to an opening of the battery container 12. The positive electrode pole and the negative electrode pole are respectively connected to the positive electrode terminal 16 and the negative electrode terminal 17. In a liquid inlet provided on the lid 15, a vent cap 18 having an opening for ventilation to eject a gas generated inside of the battery to the outside of the battery is attached.

Figure 2:
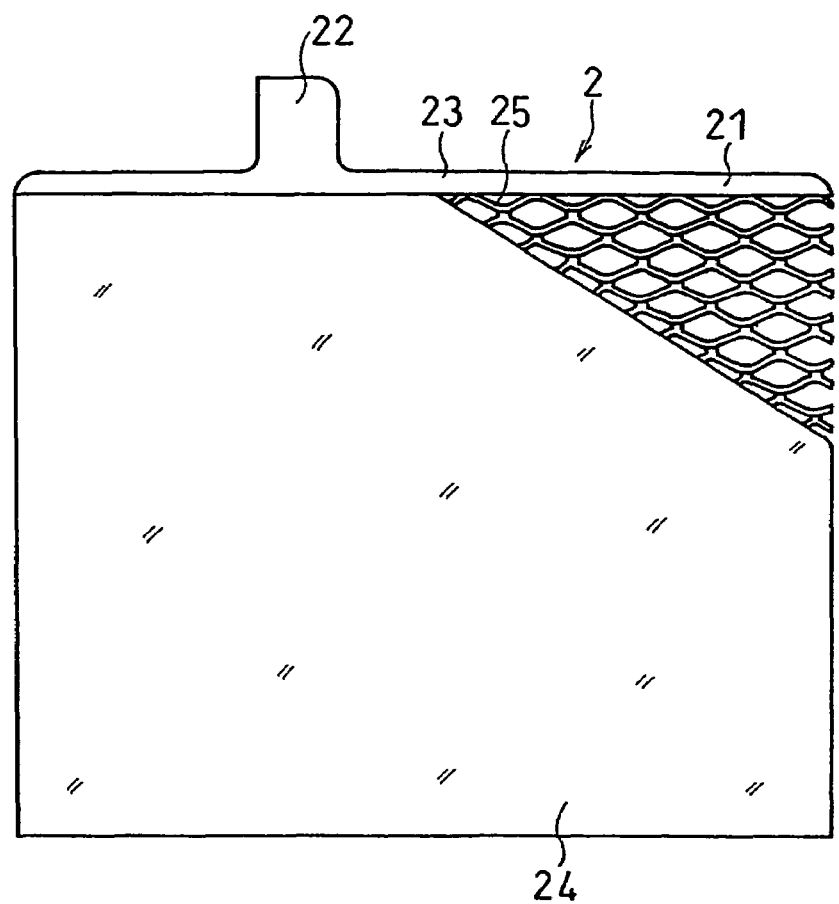
[FIG. 2] A front view of a positive electrode plate of the same lead storage battery.

A front view of a positive electrode plate 2 is illustrated in FIG. 2.

The positive electrode plate 2 comprises a positive electrode grid 21 having a tab 22 and a positive electrode active material layer 24 retained by the positive electrode grid 21. The positive electrode active material layer 24 mainly comprises a positive electrode active material ($PbO_2$), and other than the positive electrode active material, the positive electrode active material layer 24 may include a small amount of a conductive material such as carbon, and a binder, for example. The positive electrode grid 21 is an expanded grid comprising an expanded mesh 25 retaining the positive electrode active material layer 24, a frame 23 provided on an upper edge of the expanded mesh 25, and the tab 22 connected to the frame 23.

The positive electrode grid 21 and a positive electrode connecting member 10 comprise a Pb-alloy including at least one of Ca and Sn.

For the Pb-alloy, a Pb—Ca alloy including 0.01 to 0.10 wt % of Ca, a Pb—Sn alloy including 0.05 to 3.0 wt % of Sn, or a Pb—Ca—Sn alloy including Ca and Sn may be used, in terms of corrosion resistance and mechanical strength. It is preferable that the positive electrode grid comprises a Pb—Ca—Sn alloy including 0.03 to 0.10 wt % of Ca and 0.6 to 1.8 wt % of Sn. It is further preferable that the Pb—Ca—Sn alloy includes 0.8 to 1.8 wt % of Sn.

The Pb-alloy including at least one of Ca and Sn used for the positive electrode grid and the positive electrode connecting member does not include Sb substantially. However, Sb in a very small amount of approximately below 0.002 wt % may be included as impurity in the Pb-alloy, to the extent which will not give adverse effects to the battery performance due to increases in electrolyte loss and self-discharge. When the Sb content in the positive electrode grid and the positive electrode connecting member is to such extent, Sb will not migrate to the negative electrode plate.

Also, in order to improve corrosion resistance of the positive electrode grid, the lead alloy of the positive electrode grid body may include 0.01 to 0.08 wt % of Ba and 0.001 to 0.05 wt % of Ag. When the lead alloy including Ca is to be used, about 0.001 to 0.05 wt % of Al may be added in order to suppress dissipation of Ca from molten lead alloy due to oxidation. Also, 0.0005 to 0.005 wt % of Bi may be included as an impurity.

It is preferable that the positive electrode grid 21 has a lead alloy layer including 2.0 to 7.0 wt % of Sn on at least a part of a surface thereof where the positive electrode active material layer is in contact. Based on this lead alloy layer, generation of a passivated layer at an interface of the positive electrode active material layer and the positive electrode grid is suppressed, and the positive electrode plate becomes more durable to over-discharge.

When the positive electrode grid includes Sn, it is preferable that the Sn content in the lead alloy layer is more than the Sn content in the positive electrode grid. For example, when the positive electrode grid includes 1.6 wt % of Sn, it is preferable that the lead alloy layer includes Sn of at least over 1.6 wt %, and it is further preferable that the Sn content in the lead alloy layer is 3.0 to 6.0 wt %. When the Sn content in the lead alloy layer is less than the Sn content in the positive electrode grid, the above effects of Sn become less, due to the existence of the lead alloy layer having less Sn content at the interface between the positive electrode grid and the positive electrode active material.

The positive electrode grid having the lead alloy layer including Sn in at least a part of the surface thereof where the positive electrode active material layer is in contact can be obtained in the following manner, for example. A base material sheet comprising a Pb-alloy, and a lead alloy foil including Sb are supplied between a pair of rollers and the lead alloy foil is pressed to attach onto the base material sheet, thereby obtaining a composite sheet comprising a base material layer and a lead alloy layer. At this time, the lead foil is pressed to attach onto a part of the base material sheet where at least an expanded mesh is formed by an expanding mentioned later. Then, an expanded grid is obtained by expanding the composite sheet. It is preferable that a thickness of the base material layer in the composite sheet is 0.7 to 1.3 mm, and a thickness of the lead alloy layer is 1 to 20 μm.

Figure 3:
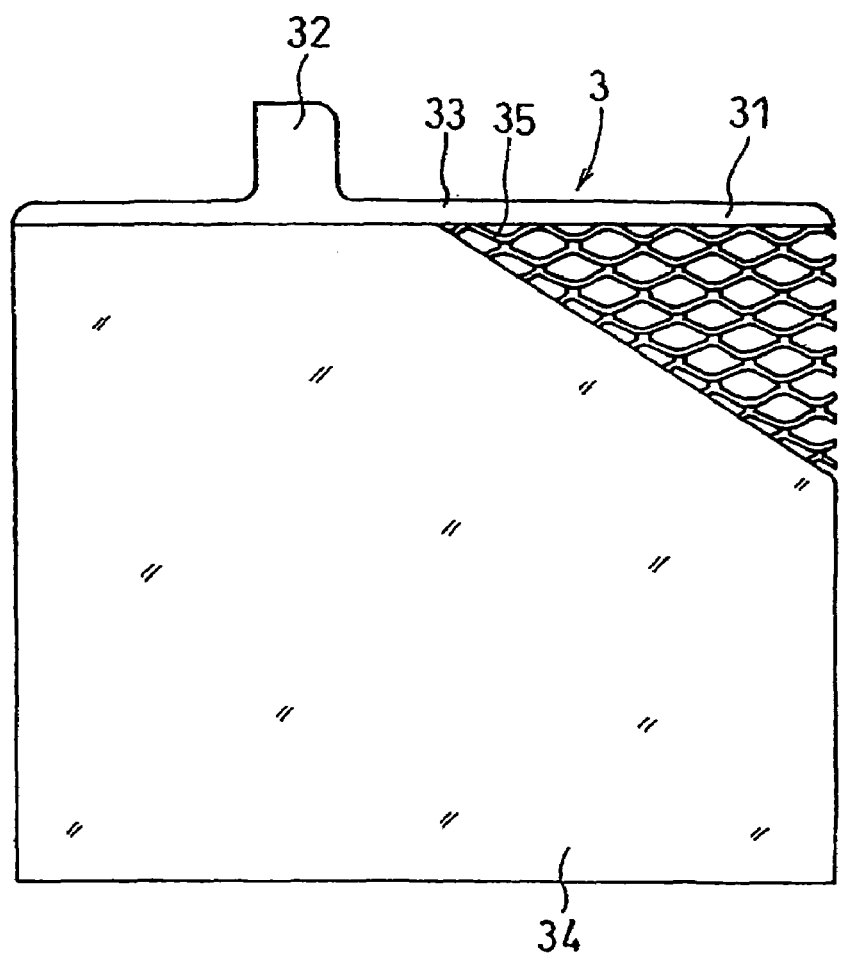
[FIG. 3] A front view of a negative electrode plate of the same lead storage battery.

A front view of a negative electrode plate 3 is shown in FIG. 3.

The negative electrode plate 3 comprises a negative electrode grid 31 having a tab 32, and a negative electrode active material layer 34 retained by the negative electrode grid 31. The negative electrode active material layer 34 mainly comprises a negative electrode active material (Pb), and may include, other than the negative electrode active material, a small amount of an expander such as lignin and barium sulfate, a conductive material such as carbon and the like, and a binder. The negative electrode grid 31 is an expanded grid comprising an expanded mesh 35 in which the negative electrode active material layer 34 is retained, a frame 33 provided on an upper edge of the expanded mesh 35, and the tab 32 connected to the frame 33.

The negative electrode grid 31 and a negative electrode connecting member 9 do not substantially include Sb, and comprise a Pb-alloy including at least one of Ca and Sn. However, the Pb-alloy may include a trace amount of Sb below 0.001 wt % as an impurity. The amounts of self discharge and electrolyte loss do not increase, when the Sb content is to such extent.

Although a Pb—Ca—Sn alloy can be used for the negative electrode grid, as in the positive electrode grid, Sn is not essential, since the negative electrode grid is less prone to corrosion compared with the positive electrode plate. A Pb-alloy including 0.2 to 0.6 wt % of Sn may be used in the negative electrode grid, in order to improve strength of negative electrode grid, and to improve fluidity of molten lead at the time of producing the grid. Alternatively, a Pb-alloy including 0.03 to 0.10 wt % of Ca may be used, in view of mechanical strength.

The negative electrode active material layer 34 includes 0.0001 to 0.003 wt % of Sb. By including Sb which is lower in hydrogen overvoltage than the negative electrode active material in the negative electrode active material layer, the charge potential of the negative electrode plate rises, and the chargeability of the negative electrode plate is drastically improved. Additionally, the corrosion of the tab of negative electrode grid can be suppressed, because Sb in the negative electrode active material layer barely dissolves into the electrolyte.

The service life characteristics are improved especially when the Sb content in the negative electrode active material layer is not less than 0.0001 wt %. On the other hand, when the Sb content in the negative electrode active material layer is over 0.003 wt %, the corrosion of the tab of negative electrode grid gradually advances.

It is preferable that Sb content in the negative electrode active material layer is 0.0001 to 0.001 wt %, since the effects of suppressing the corrosion of the tab of negative electrode grid and suppressing the electrolyte loss due to charge/discharge cycles can be obtained remarkably.

As for the addition of Sb to the negative electrode active material layer, for example, Sb, an oxide or sulfate of Sb, or a compound including Sb such as an antimonate may be added in a negative electrode paste at the time of producing a negative electrode paste. Other than these, Sb can be electrodeposited on the negative electrode active material, by immersing the negative electrode plate in an electrolyte including Sb ion, for example, dilute sulfic acid including an antimony sulfate or antimonite, and electroplating.

The negative electrode active material layer 34 includes 0.01 to 2.0 wt % of the condensate (hereinafter referred to as condensate A) of bisphenol and aminobenzene sulfonic acid derivative, in addition to the above Sb. When the condensate A is used in combination with Sb, remarkable effects can be obtained in which cycle life characteristics are improved under lower SOC range, other than the effect as an expander. As one of the factors to cause such effects above, uniform dispersion of Sb in the negative electrode active material layer when the condensate A is added in the negative electrode active material layer can be mentioned.

The condensate A has a structure represented by a general formula (1) below, for example:

[Chemical formula 1]

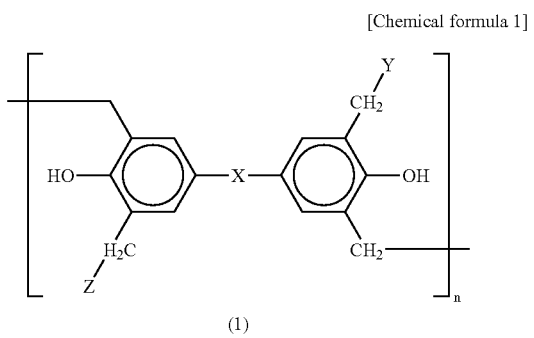

(1)

In the general formula (1), X has a structure represented by the chemical formula (2):

[Chemical formula 2]

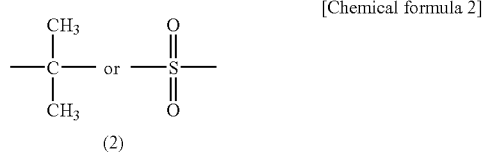

(2)

Y and Z in the general formula (1) independently have the chemical formula (3):

[Chemical formula 3]

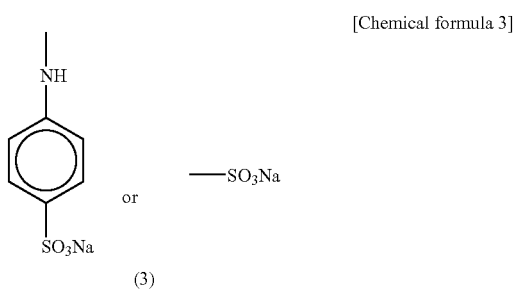

(3)

The weight average molecular weight of the condensate A is 10000 to 25000. Y and Z are mainly sodium salt of aminobenzene sulfonic acid, and partly include sodium salt of sulfonic acid. The condensate A may be structured with X, Y, and Z having a single structure, or may be structured with X, Y, and Z having a different kind of structure in any of X, Y, and Z. As for the condensate A represented by the formula (1), VISPERSE P215 manufactured by Nippon Paper Chemicals can be mentioned, for example.

As described above, by including 0.0001 to 0.003 wt % of Sb, and 0.01 to 2.0 wt % of condensate A in the negative electrode active material layer, decrease in the amount of the electrolyte is suppressed, and a longer service life can be achieved under a usage mode in which charge/discharge is repeated under lower SOC range.

When the amount of the condensate A included in the negative electrode active material layer is over 0.2 wt %, chargeability of the negative electrode plate declines to a certain extent, and cycle life characteristics decline. Therefore, it is preferable that the amount of the condensate A included in the negative electrode active material layer is 0.01 to 0.2 wt %.

The positive electrode plate 2 and the negative electrode plate 3 may be obtained by a method illustrated below.

An unformed positive electrode plate can be obtained by filling a positive electrode paste into a positive electrode grid, and then curing and drying, for example. In the positive electrode paste, raw material lead powder (a mixture of lead and lead oxide), sulfuric acid, water, and the like are mixed.

An unformed negative electrode plate can be obtained by filling a negative electrode paste into a negative electrode grid, and then curing and drying, for example. In the negative electrode paste, a raw material lead powder (lead and lead oxide), sulfuric acid, water, and an expander such as lignin and barium sulfate are mixed.

Then, the above positive electrode plate 2 and the negative electrode plate 3 are obtained by forming the unformed positive and negative electrode plates. The forming may be conducted within a battery container of a lead storage battery made by using unformed positive and negative electrode plates, or may be conducted before composing an electrode plate pack at the time of producing a lead storage battery.

Although the expanded grid was used for the positive electrode grid and the negative electrode grid in the above, a casted grid may also be used.

A micro-porous polyethylene sheet is used for the separator 4. Carbon may be included in the polyethylene, in order to improve ion conductivity.

The microporous polyethylene sheet has electrolyte-permeable fine pores with a pore diameter of approximately 0.01 to 1 μm. When the diameter of the pore is over 1 μm, an active material easily passes through the separator.

For the separator 4, a fiber mat having resistance to acids is used. For the fiber, a glass fiber with a fiber diameter of 0.1 to 2 μm, or a synthetic fiber such as a polypropylene resin fiber and the like with a fiber diameter of 1 to 10 μm is used, for example. It is preferable that the separator comprises a fiber mat having resistance to acids, in view of obtaining excellent cycle life characteristics and suppressing separation of the positive electrode active material from the positive electrode plate.

Although an internal resistance of a battery increases when the fiber mat is used, compared with the case when a polyethylene sheet is used, in a lead storage battery of the present invention, excellent cycle life characteristics can be obtained even when the fiber mat is used for the separator, because chargeability of the negative electrode plate improves.

For the separator, a polyethylene sheet or a glass fiber mat is folded to two (a letter-U shape) and a negative electrode plate is inserted therebetween, for example.

Each cell includes an electrolyte. And a positive electrode strap, a negative electrode strap, and an electrode plate pack are entirely immersed in the electrolyte. Since the negative electrode plate and the negative electrode strap do not contact with air, these are not easily oxidized. The present invention is not applied to a valve regulated lead storage battery which absorbs oxygen gas with a negative electrode plate, since the negative electrode active material layer includes Sb which is lower in hydrogen overvoltage than the negative electrode active material. When the present invention is applied to the valve regulated lead storage battery, based on a gas generation in a small amount, an internal pressure of the battery increases, and the control valve stays open for a long period of time. As a result, air flows into the battery and a negative electrode plate becomes oxidized, thereby making the battery prone to deteriorate.

Examples of the present invention are described in the following in detail.

EXAMPLE 1

(1) Production of Positive Electrode Plate

A positive electrode plate 2 shown in FIG. 2 was produced as in the following.

A raw material lead powder (a mixture of lead and lead oxide), water, and a dilute sulfic acid were mixed and kneaded in a weight ratio of 100:15:5, to obtain a positive electrode paste.

The base material sheet comprising a Pb-alloy containing 0.06 wt % of Ca and 1.6 wt % of Sn obtained by casting was pressed to have a thickness of 1.1 mm. After predetermined slits were formed on the base material sheet 27, the slits were expanded to form an expanded mesh 25 (FIG. 4($a$)), to obtain an expanded grid body (expansion process). A center part of the base material sheet 27 was not expanded, since the part is to be used for forming a tab 22 and a frame 23 of the positive electrode grid mentioned later.

Figure 4:
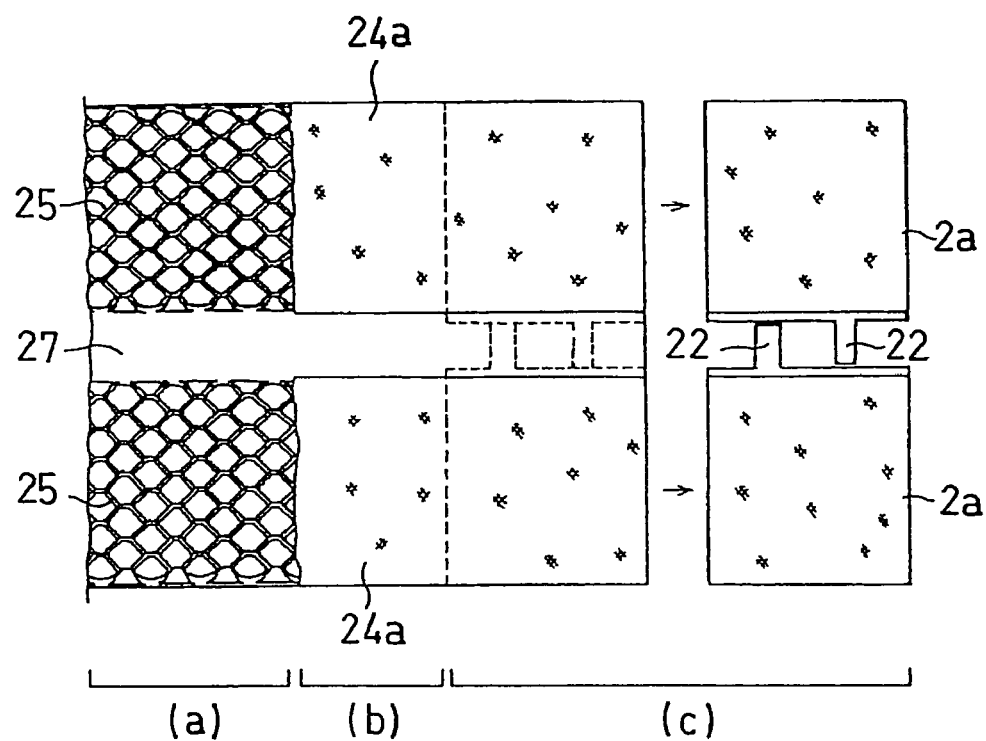
[FIG. 4] An illustration of a process of expanding a base material sheet.

A positive electrode paste 24$a$ was filled into the expanded grid 25 (FIG. 4($b$)), and was cut and formed to have an electrode plate shape having the tab 22 of positive electrode grid (FIG. 4($c$)). The expanded grid thus cut and formed was cured and dried, to obtain an unformed positive electrode plate 2$a$ (length: 115 mm, width: 137.5 mm). Then, the unformed positive electrode plate 2$a$ was formed in a battery container, mentioned later, to obtain the positive electrode plate 2 comprising the positive electrode grid 21 retaining the positive electrode active material layer 24.

(2) Production of Negative Electrode Plate

The negative electrode plate 3 shown in FIG. 3 was produced as shown below.

A raw material lead powder, water, dilute sulfic acid, and a barium sulfate as an expander were kneaded in a weight ratio of 100:15:3.5:2.5 to obtain a negative electrode paste. Then, antimony sulfate was added at the time of keading the negative electrode paste, so that Sb content in the negative electrode active material layer mentioned later becomes 0.001 wt %. Further, VISPERSE P215 (manufactured by Nippon Paper Chemicals) was added as a condensate A, so that the condensate A content in the negative electrode active material layer mentioned later became 0.2 wt %.

On the other hand, a base material sheet comprising a Pb-alloy containing 0.07 wt % of Ca and 0.25 wt % of Sn obtained by casting was pressed to have a thickness of 0.7 mm, and expanded in the same manner as the above. The expanded mesh was filled with the negative electrode paste, and an unformed negative electrode plate (length: 115 mm, and width: 137.5 mm) was obtained in the same manner as the above. Then, the unformed negative electrode plate was formed in a battery container, mentioned later, to obtain the negative electrode plate 3 comprising the negative electrode grid 31 retaining the negative electrode active material layer 34.

(3) Fabrication of Lead Storage Battery

A lead storage battery 1 with a structure shown in FIG. 1 was produced by the following method.

Six pieces of the negative electrode plate 3 and five pieces of the positive electrode plate 2 obtained in the above were respectively stacked alternately interposing the separator 4 to obtain an electrode plate pack 11. Herein, a glass fiber mat with a thickness of 1.00 mm (average fiber diameter of 0.8 μm) was used for the separator 4. The glass fiber mat was folded to two and the negative electrode plate was inserted therebetween, to dispose the separator 4.

Subsequently, the tabs 22 and the tabs 32 were respectively welded together, to obtain a positive electrode strap 6 and a negative electrode strap 5. Each of the electrode plate packs 11 was stored in six cell chambers 14 partitioned by partitions 13 in the battery container 12. Adjacent electrode plate packs were connected in series by connecting a positive electrode connecting body 8 connected to the positive electrode strap 6 with a negative electrode connecting body connected to a negative electrode strap of adjacent electrode plate pack. In this example, the connection between the electrode plate packs was made by through hole (not shown) provided at the partitions 13.

In the electrode plate packs stored in cell chambers 14 positioned at both ends, a positive electrode pole was formed on the positive electrode strap in one electrode plate pack, and a negative electrode pole 7 was formed on the negative electrode strap 5 in other electrode plate pack. Then, a lid 15 was attached to an opening of the battery container 12, while a positive electrode terminal 16 and a negative electrode terminal 17 provided on the lid 15 were welded with the positive electrode pole and the negative electrode pole 7, respectively. Subsequently, a predetermined amount of sulfuric acid with a concentration of 34 wt %, as an electrolyte, was pored in each cell from a liquid inlet provided on the lid 15, and a formation was conducted in the battery container. After the formation, vent caps 18 having vent holes for ejecting a gas generated inside the battery to the outside were fixed into the liquid inlet, to obtain a lead storage battery of 55D23 type (12V-48Ah) (hereinafter referred to as a battery) specified in JIS D5301. After the formation, the electrode plate pack 11, the positive electrode strap 6, and the negative electrode strap 5 were entirely immersed in the electrolyte.

For the positive electrode connecting member and the negative electrode connecting member, a Pb-alloy containing 2.5 wt % of Sn was used. As a result of a quantitative analysis for the Sb content in the Pb-alloy containing 2.5 wt % of Sn, the Sb content was below the detection limit (0.0001 wt %).

As a result of a quantitative analysis for the Sb content in the base material sheet used for the positive electrode grid, the positive electrode active material layer, and the negative electrode grid, Sb content was below the detection limit (0.0001 wt %).

EXAMPLE 2

Lignosulfonic acid (VANILLEX N manufactured by Nippon Paper Chemicals) was added to a negative electrode paste so that 0.2 wt % of the lignosulfonic acid is included in the negative electrode active material layer. A battery B was produced in the same manner as in Example 1 except for the above.

EXAMPLE 3

A battery C was produced in the same manner as in Example 1, except that a microporous polyethylene sheet with a pore diameter not more than 1 μm was used for a separator, instead of the glass fiber mat.

EXAMPLE 4

Figure 5:
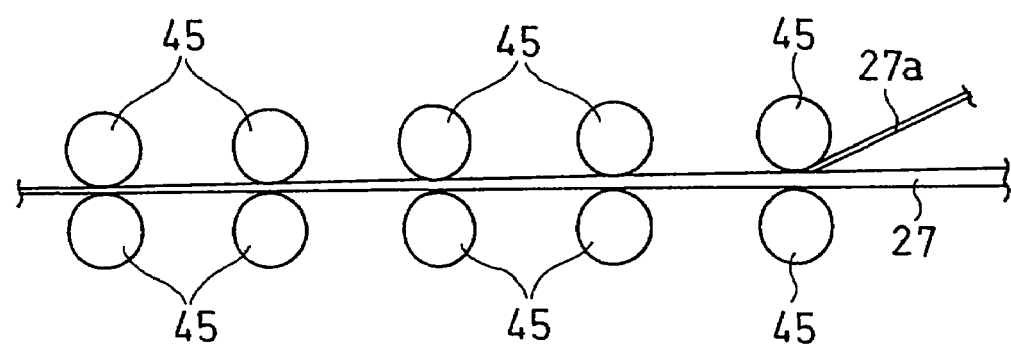
[FIG. 5] An illustration of a process of obtaining a composite sheet used for producing a grid body.

As shown in FIG. 5, a lead alloy foil 27a was supplied with a base material sheet 27 between a pair of rollers 45, and the base material sheet 27 and the lead alloy foil 27a were simultaneously pressed, in a pressing step of a positive electrode grid fabrication. By this pressing process, the lead alloy foil 27a was attached onto the base material sheet 27, and a composite sheet having a lead alloy layer with a thickness of 20 μm on one side of a base material layer with a thickness of 1.1 mm was obtained. A lead alloy containing 5.0 wt % of Sn was used for the lead alloy foil 27a. For the base material sheet 27, Pb-alloy containing 0.06 wt % of Ca and 1.6 wt % of Sn was used.

For the part of the base material sheet 27 where the lead alloy foil 27a is to be pressed onto, only a part where an expanded grid is to be formed in an expanding process mentioned later was pressed, and the lead alloy foil was not pressed onto a center part of the base material sheet 27 where a tab 22 of positive electrode grid is to be formed, as shown in FIG. 4.

Figure 6:
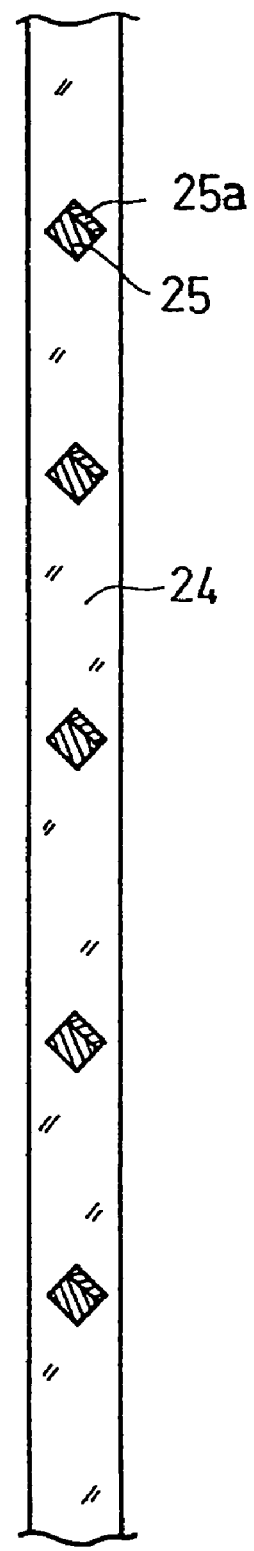
[FIG. 6] A longitudinal sectional view showing a portion of a positive electrode plate using a positive electrode grid body having a lead alloy layer on a surface thereof.

A positive electrode plate 2 was obtained in the same manner as the above, except that an expansion process was conducted for the composite sheet. In this positive electrode plate, the expanded mesh 25 having rhombic cross sections comprises the lead alloy layer 25a including 5.0 wt % of Sn on a surface thereof, as shown FIG. 6.

A battery D was produced in the same manner as in Example 1, except that the above positive electrode plate was used.

COMPARATIVE EXAMPLE 1

A battery E was produced in the same manner as in Example 1, except that antimony sulfate and a condensate A were not added to the negative electrode paste.

COMPARATIVE EXAMPLE 2

A battery F was produced in the same manner as in Comparative Example 1, except that antimony sulfate was added to the negative electrode paste so that 0.001 wt % of Sb was included in a negative electrode active material layer.

COMPARATIVE EXAMPLE 3

A battery G was produced in the same manner as in Comparative Example 1, except that a condensate A was added to the negative electrode paste so that 0.2 wt % of the condensate A was included in a negative electrode active material layer.

COMPARATIVE EXAMPLE 4

A battery H was produced in the same manner as in Comparative Example 1, except that lignosulfonic acid was added to the negative electrode paste so that 0.2 wt % of the lignosulfonic acid was included in a negative electrode active material layer.

COMPARATIVE EXAMPLE 5

A battery I was produced in the same manner as in Comparative Example 1, except that antimony sulfate and lignosulfonic acid were added to the negative electrode paste so that 0.001 wt % of Sb and 0.2 wt % of the lignosulfonic acid were included in a negative electrode active material layer.

COMPARATIVE EXAMPLE 6

A battery J was produced in the same manner as in Comparative Example 1, except that a condensate A and lignosulfonic acid were added to the negative electrode paste so that 0.2 wt % of the condensate A and 0.2 wt % of the lignosulfonic acid were included in a negative electrode active material layer.

COMPARATIVE EXAMPLES 7 to 9

Batteries K to M were produced respectively in the same manner as in Comparative Examples 1 to 3, except that a microporous polyethylene sheet with a pore diameter of not more than 1 μm was used for a separator, instead of a glass fiber mat.

COMPARATIVE EXAMPLE 10

A battery N was produced in the same manner as in Example 1, except that a Pb alloy containing 2.5 wt % of Sb was used for a positive electrode connecting member and a negative electrode connecting member.

Evaluations as described below were conducted for the batteries A to N obtained above.

A step of discharging the battery for 60 seconds at a current of 1 CA under 40° C. ambient temperature, and then charging for 90 seconds at a constant voltage of 14.5V (maximum current value 1 CA) under 40° C. ambient temperature was repeated. A discharge was conducted at 300 A for every 500 cycles of the above step. The service life of the battery was determined as ended when a voltage of the battery at the $5^{th}$ second of the discharging became not more than 8V. Results of the evaluation are shown in Table 1.

TABLE 1

| | Battery No. | Separator Material | Substances to be Added to Negative Electrode Paste | | | No. of Cycles (1000 times) |
|---|---|---|---|---|---|---|
| | | | Sb | Condensate A | Lignosulfonic Acid | |
| Example 1 | A | Glass Fiber | ○ | ○ | X | 51 |
| Example 2 | B | Glass Fiber | ○ | ○ | ○ | 58 |
| Example 3 | C | Polyethylene | ○ | ○ | X | 40 |
| Example 4 | D | Glass Fiber | ○ | ○ | X | 52 |
| Comparative Example 1 | E | Glass Fiber | X | X | X | 20 |
| Comparative Example 2 | F | Glass Fiber | ○ | X | X | 26 |
| Comparative Example 3 | G | Glass Fiber | X | ○ | X | 23 |
| Comparative Example 4 | H | Glass Fiber | X | X | ○ | 23 |
| Comparative Example 5 | I | Glass Fiber | ○ | X | ○ | 30 |
| Comparative Example 6 | J | Glass Fiber | X | ○ | ○ | 22 |
| Comparative Example 7 | K | Polyethylene | X | X | X | 20 |
| Comparative Example 8 | L | Polyethylene | ○ | X | X | 22 |
| Comparative Example 9 | M | Polyethylene | X | ○ | X | 23 |
| Comparative Example 10 | N | Glass Fiber | ○ | ○ | X | 16 |

In the battery which used the Pb alloy containing 2.5 wt % of Sb for the positive and negative electrode connecting members, corrosion of a tab of negative electrode grid advanced and cycle life characteristics declined. This is probably because the Sb included in the positive and negative electrode connecting members dissolved into the electrolyte, and the dissolved Sb deposited on the tab of negative electrode grid.

In comparative examples 1 and 7, in which Sb and the condensate A were not added, cycle life characteristics drastically declined, regardless of any separator material used. On the other hand, in Comparative Examples 2 and 8, in which Sb was added to the negative electrode active material layer, and in Comparative Examples 3 and 9, in which the condensate A was added to the negative electrode material layer, cycle life characteristics were slightly improved.

On the other hand, in Examples 1 to 3, in which Sb and the condensate A were both added, cycle life characteristics improved.

More excellent cycle life characteristics were obtained in Example 1, in which the glass fiber mat was used for the separator, compared with Example 3, in which the microporous polyethylene sheet was used for the separator. In Example 2, in which lignosulfonic acid was further added, cycle life characteristics improved.

EXAMPLE 5

A battery was produced in the same manner as in Example 1, except that amounts of Sb and a condensate A in the negative electrode active material layer were changed variously as shown in Table 2. In Table 2, the batteries P2 to P5, Q2 to Q5, and R2 to R5 are the batteries of Examples. The batteries O1 to O6, P1, P6, Q1, Q6, R1, R6, and S1 to S6 in Table 2 are the batteries of Comparative Examples.

The cycle life test was conducted in the same manner as in Example 1. Also, battery weight was measured before and after the cycle life test, and an amount of electrolyte loss was measured. The amount of electrolyte loss (%) was calculated with a formula (W0−W1)/W0×100, where W0 was a battery weight before the cycle life test, and where W1 was a battery weight after the cycle life test.

The results of the above test are shown in Table 2.

TABLE 2

| Battery No. | Sb Content in Negative Electrode Active Material Layer (wt %) | Condensate A Content in Negative Electrode Active Material Layer (wt %) | No. of Cycles (1000 times) | Amount of Electrolyte Loss (%) |
|---|---|---|---|---|
| O1 | 0 | 0 | 15 | 5 |
| O2 | (<0.0001) | 0.01 | 21 | 5 |
| O3 | | 0.2 | 23 | 3 |
| O4 | | 1 | 21 | 3 |
| O5 | | 2 | 20 | 2 |
| O6 | | 3 | 17 | 1 |
| P1 | 0.0001 | 0 | 18 | 5 |
| P2 | | 0.01 | 41 | 9 |
| P3 | | 0.2 | 45 | 6 |

TABLE 2-continued

| Battery No. | Sb Content in Negative Electrode Active Material Layer (wt %) | Condensate A Content in Negative Electrode Active Material Layer (wt %) | No. of Cycles (1000 times) | Amount of Electrolyte Loss (%) |
|---|---|---|---|---|
| P4 | | 1 | 43 | 6 |
| P5 | | 2 | 42 | 4 |
| P6 | | 3 | 19 | 1 |
| Q1 | 0.001 | 0 | 19 | 7 |
| Q2 | | 0.01 | 45 | 13 |
| Q3 | | 0.2 | 51 | 9 |
| Q4 | | 1 | 50 | 8 |
| Q5 | | 2 | 43 | 5 |
| Q6 | | 3 | 20 | 1 |
| R1 | 0.003 | 0 | 17 | 9 |
| R2 | | 0.01 | 39 | 16 |
| R3 | | 0.2 | 42 | 10 |
| R4 | | 1 | 38 | 10 |
| R5 | | 2 | 37 | 7 |
| R6 | | 3 | 15 | 1 |
| S1 | 0.004 | 0 | 20 | 31 |
| S2 | | 0.01 | 21 | 32 |
| S3 | | 0.2 | 23 | 29 |
| S4 | | 1 | 23 | 31 |
| S5 | | 2 | 24 | 32 |
| S6 | | 3 | 22 | 29 |

In the batteries P2 to P5, Q2 to Q5, and R2 to R5 of the present invention, in which 0.0001 to 0.003 wt % of Sb and 0.01 to 2 wt % of condensate A were included in the negative electrode active material layer, electrolyte loss was suppressed and number of cycles (cycle life) increased.

Further, when 0.0001 to 0.001 wt % of Sb and 0.01 to 2 wt % of condensate A were included in the negative electrode active material layer, remarkable effects to suppress the electrolyte loss and to improve cycle life characteristics were obtained.

In the batteries O1 to O6, to which no Sb was added, cycle life characteristics declined. When the amount of Sb added was 0.004 wt %, the service life was shortened, since the batteries became prone to self-discharge and the amount of electrolyte loss increased drastically.

More excellent cycle life characteristics were obtained in batteries P2, Q2, and R2, in which the condensate A was added, compared with the batteries P1, Q1, and R1, in which the condensate A was not added. In batteries O2, P2, Q2, and R2, although the added amount of condensate A were the same, more excellent cycle life characteristics were obtained in batteries P2, Q2, and R2, in which Sb was added, than the battery O2, in which no Sb was added.

INDUSTRIAL APPLICABILITY

A lead storage battery of the present invention is suitably used for vehicles and the like which carry a stop-and-go-system and regenerative-braking-system, because of its excellent service life characteristics under a usage mode in which charge/discharge is repeated under a low SOC range.

The invention claimed is:

1. A lead storage battery including:
an electrode plate pack comprising a plurality of negative electrode plates which each comprise a negative electrode grid having a tab and a negative electrode active material layer retained by said negative electrode grid, a plurality of positive electrode plates which each comprise a positive electrode grid having a tab and a positive electrode active material layer retained by said positive electrode grid, and a plurality of separators separating said positive electrode plate and said negative electrode plate;
a positive electrode connecting member comprising a positive electrode strap to which said tab of each positive electrode plate of the electrode plate pack is connected, and a positive electrode pole or a positive electrode connecting body provided at said positive electrode strap; and
a negative electrode connecting member comprising a negative electrode strap to which said tab of each negative electrode plate of the electrode plate pack is connected, and a negative electrode pole or a negative electrode connecting body provided at said negative electrode strap,
wherein said positive electrode grid, said negative electrode grid, said positive electrode connecting member, and said negative electrode connecting member comprise a Pb-alloy including at least one of Ca and Sn, and
said negative electrode active material layer includes 0.0001 to 0.003 wt % of Sb, and includes 0.01 to 2 wt % of condensate of bisphenol and aminobenzene sulfonic acid derivative.

2. The lead storage battery in accordance with claim 1, wherein Sb content in said negative electrode active material layer is 0.0001 to 0.001 wt %.

3. The lead storage battery in accordance with claim 1, wherein said separator comprises a fiber having resistance to acids.

4. The lead storage battery in accordance with claim 3, wherein said fiber is a glass fiber or a synthetic fiber.

* * * * *